United States Patent
Grant et al.

(10) Patent No.: US 6,618,039 B1
(45) Date of Patent: *Sep. 9, 2003

(54) POCKET-SIZED USER INTERFACE FOR INTERNET BROWSER TERMINALS AND THE LIKE

(76) Inventors: Gerry R. Grant, P.O. Box 807, Silverado, CA (US) 92676; David G. Holey, P.O. Box 807, Silverado, CA (US) 92676

( * ) Notice: Subject to any disclaimer, the term of this patent is extended or adjusted under 35 U.S.C. 154(b) by 0 days.

This patent is subject to a terminal disclaimer.

(21) Appl. No.: 09/100,926

(22) Filed: Jun. 19, 1998

Related U.S. Application Data

(63) Continuation-in-part of application No. 08/713,210, filed on Sep. 12, 1996, now Pat. No. 5,854,624.

(51) Int. Cl.$^7$ .................................................. G09G 5/08
(52) U.S. Cl. ........................ 345/168; 345/156; 345/169
(58) Field of Search ................................. 345/158, 168, 345/169, 170–172, 156, 157, 160, 163, 167; 359/148; 348/734; 341/21–23

(56) References Cited

U.S. PATENT DOCUMENTS

| | | | | |
|---|---|---|---|---|
| 5,243,331 A | * | 9/1993 | McCausland et al. | 345/172 |
| 5,450,079 A | * | 9/1995 | Dunaway | 345/169 |
| 5,481,265 A | * | 1/1996 | Russell | 345/172 |
| 5,563,630 A | * | 10/1996 | Tsakiris et al. | 345/160 |
| 5,724,106 A | * | 3/1998 | Autry et al. | 348/734 |
| 5,956,655 A | * | 9/1999 | Suzuki et al. | 345/169 |
| 5,999,827 A | * | 12/1999 | Sudo et al. | 345/169 |
| 6,198,473 B1 | * | 3/2001 | Armstrong | 345/163 |

* cited by examiner

Primary Examiner—Bipin Shalwala
Assistant Examiner—Mansour M. Said
(74) Attorney, Agent, or Firm—Steins & Associates, P.C.

(57) ABSTRACT

A Pocket-sized User Interface for Internet Browser Terminals and the Like is disclosed. The disclosed interface provides a plurality of pre-programmed as well as user-programmable touch-sensitive switches that integrate with frequently-used browser functions. The disclosed touch-sensitive switch functions may be responsive to the application that the user is interfacing with. A critical aspect of the disclosed interface is that the housing be less than about 0.45 inches in thickness, and further be roughly the length and width of a standard business card, however, other sizes may be available to provide further utility. Also disclosed is an attachment means for attaching the keypad of the present interface to one's arm or leg, or other structure, such as a monitor, keyboard, desktop or other surface. Still further disclosed is a keypad that is in wireless communication with a browser terminal, and that further includes a user display for displaying pertinent information. Also disclosed in other preferred embodiments are keypads that: include multimedia device control capability; are configured for the physically handicapped user; are provided as an addition to a conventional keyboard; as well as devices having the touch-sensitive switches that may also be voice-activated; these switches being arranged on a touch pad.

18 Claims, 8 Drawing Sheets

POCKET-SIZED USER INTERFACE FOR INTERNET BROWSER TERMINALS AND THE LIKE

This application is a continuation-in-part of U.S. patent application Ser. No. 08/713,210 filed Sep. 12, 1996 U.S. Pat. No 5,854,624, now pending.

BACKGROUND OF THE INVENTION

1. Field of the Invention

This invention relates generally to computer user interfaces, including the convergence of computer technology into personal computers, televisions, telephones, video games, personal digital assistants and other consumer electronics, and more specifically, to a Pocket-sized User Interface for Internet Browser Terminals and the Like.

2. Description of Related Art

Personal computers have indisputably revolutionized the world, having applications suited for nearly every aspect of our daily lives. One of the most significant on going developments of the personal computer deals with the "Internet." Even though the Internet is only just beginning to be fully developed and exploited to its full potential, a large percentage of our population has found many uses for it. It seems that one can find nearly any resource on the Internet and, therefore, people are spending more and more time "surfing" the 'Net.

Surfing the Net describes a person exploring the vast data resources available on the Internet via an "Internet browser." Internet browsers are software applications that are specially designed to allow users to browse, view, download and otherwise manipulate the data available on the Internet. There are a handful of browsers that have attained wide success in the Internet market; these browsers have become somewhat standardized in their functionality, although there continues to be refinement and expansion from the original packages. This browser software is now becoming a cross-platform operating system that is being used off the Internet in local and wide area networks (Intranets), as well as for Extranets.

Until now, the majority of terminals for access to the Internet have been personal computers. It is common for today's personal computers to include a keyboard and a pointing device, such as a "mouse," "trackball," or the like. These keyboards are also the devices that users employ to use the computer—for such things as word processing, drawing, or even playing games. Keyboards are well suited in most cases for these applications, where a wide range of functionality is needed.

Internet browsers, on the other hand, do not mandate this broad applicability. As a typical person browses the Web or an Intranet, only a small percentage of his or her actions require the full keyboard of a personal computer. Much of that person's activities comprise the use of a series of pre-programmed functions available through the browser application; one need only press a screen representation of a single button or series of buttons to activate the desired function.

Indeed, there are problems with the use of keyboards for browser interface. First, the aspects of convenience and speed. A typical graphical-interface browser has preprogrammed functions that appear as buttons, either on the command border to the browser, in pull-down menus, or as included at a particular Web site that is being viewed. In order to activate this preprogrammed function with a conventional keyboard/pointer arrangement, one must manually move the arrow on the screen (with the pointer) to the desired button representation or pull-down menu selection, and then depress it. This can be time-consuming and even physically exhausting for users who spend a significant amount of time "surfing." A user interface that is tailored to browser applications, including keys, touch-pads, or voice-activated switches corresponding to the pre-programmed functions used by the browser, would be very helpful in this regard.

A second problem of the conventional keyboard/pointer arrangement is that of functionality. While, as discussed above, the keyboard is suited for a wide variety of applications, it is not tailored to any one application in particular. In the case of operating a browser, such as when surfing the Net, users frequently perform a small group of actions. As stated above, the conventional keyboard/pointer does not typically provide any "shortcuts" to perform these activities. The conventional keyboard/pointer user must manually select, or type in the desired action each and every time that the action is desired; the amount of movement required to "click on" scroll bars, forward and back buttons, and the like, can be very inconvenient when doing so on the terminal screen, particularly when the user must switch to the keyboard to select "hot keys." A user interface with pre-programmed function keys or pads that may also be voice-activated, that would cause the browser to execute common functions would be very helpful with this problem.

A third, and very serious, problem with conventional keyboards is a physical ailment known as carpal tunnel syndrome. Carpal tunnel syndrome is a type of tendonitis, or inflammation of the tendons, in the hand. CTS (carpal tunnel syndrome) has been linked to long-term use of computer keyboards, and has become a serious health problem for individuals and, consequently, a serious and expensive liability for corporations with a lot of computer users. CTS can result from the unique hand position required to operate a conventional keyboard. The act of holding one's fingers poised and depressing the keyboard's keys for long hours can irritate some of the hand's tendons. The remedy for CTS has been for computer users to wear wrist braces that help to support the hands and thereby reduce the tendons' irritation. The problem with these braces is that they significantly reduce the person's hand mobility and dexterity. If the user interface was configured so that it could be held in one's hand, laid on one's lap or strapped around one's wrist, it would virtually eliminate the hazard of acquiring CTS while surfing the Net. An interface such as this would also reduce the shoulder and neck strain that commonly results from keeping one's arms and shoulders in one position for long periods of time.

Another prior computer-user interface is a "joystick." These devices are primarily configured for interaction with computer games, or "video games." A wide variety of joysticks are available on the market today, with a series of shapes and functionality's being available. These joysticks are very well suited for use with video games, and more enjoyment can be obtained by playing these video games through the use of a joystick. The basic joystick includes a base with a hand-grip configured pointing device. The hand grip typically includes at least one button that is generally used to simulate a trigger while playing a game. Many times the base will also include other buttons for additional functionality. Again, these joysticks are very well suited for playing video games; they are unsuitable for surfing the Net. Although benefits could be achieved by the large hand-grip pointing device, the joystick will not provide sufficient programmability or functionality to truly optimize Net surfing or other browser or application interface. Furthermore, the joystick is much too large to be an efficient browser interface; since the standard keyboard would still be needed, the joystick would add unnecessary clutter to the desktop. An application-specific user interface for use with browser terminals that is smaller than a joystick would solve this problem.

SUMMARY OF THE INVENTION

In light of the aforementioned problems associated with the prior devices, it is an object of the present invention to provide a pocket-sized user interface for world-wide web terminals and the like, such as personal computers, televisions, telephones, video games, personal digital assistants and other consumer electronics. It is a further object that the user interface provide a series of pre-programmed as well as programmable keys that integrate with frequently-used browser functions. Still further, the present interface might be less than about 0.45 inches in thickness and be roughly the length and width of a standard business card. One type of embodiment may include an attachment means for attaching the keypad of the interface to one's arm or leg or other structure, such as a monitor, keyboard, desktop or other surface. A further object is that the keypad be in wireless communication with the browser terminal, in order to reduce workspace clutter. Another preferred embodiment may include a user display on the keypad to display pertinent information to the user. Also, in other preferred embodiments, the keypads should: include multimedia device control capability; be configured for the physically handicapped user; be provided as an addition to a conventional keyboard; as well as be available with touch- and/or voice-sensitive switches arranged on a touch pad.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Pocket-sized User Interface for Internet Browser Terminals and the Like.

Figure 1:
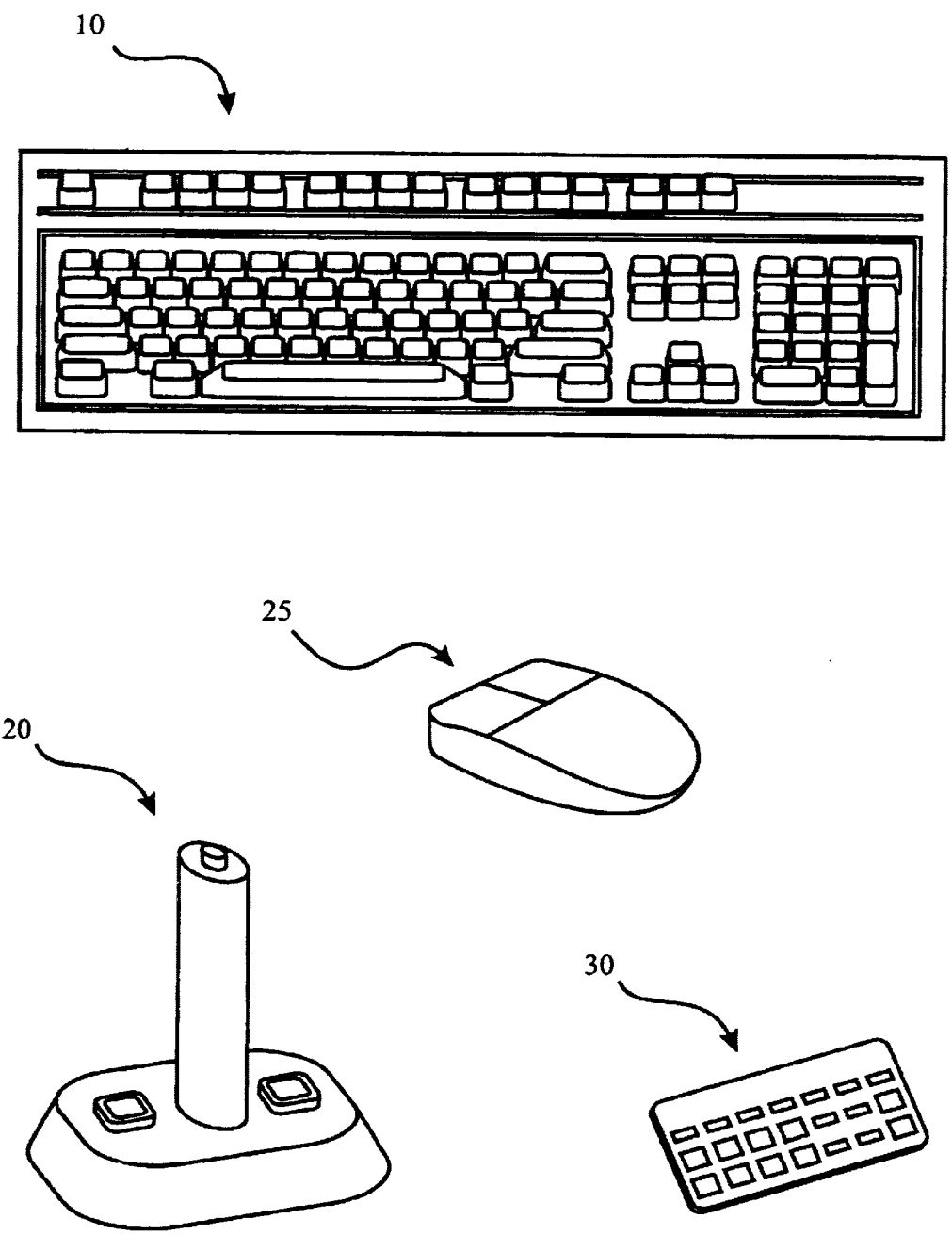
FIG. 1 is a collection of views of the prior art and a preferred embodiment of the present invention.

The present invention can best be understood by initial consideration of FIG. 1. FIG. 1 is a collection of views of the prior art and a preferred embodiment of the present invention. A conventional keyboard 10 is displayed at roughly ⅓rd of actual size. Also depicted is a representation of a conventional joystick 20, also at roughly ⅓rd of actual size. Further depicted is a conventional mouse 25, which is also shown at roughly ⅓rd of actual size. As can be seen the keypad 30 of the present invention, which is also roughly ⅓rd of actual size, is much more compact than the keyboard 10 or the joystick 20 or the mouse 25. It is for this reason that the keypad 30 of the present invention can provide such significant advantages.

Figure 2:
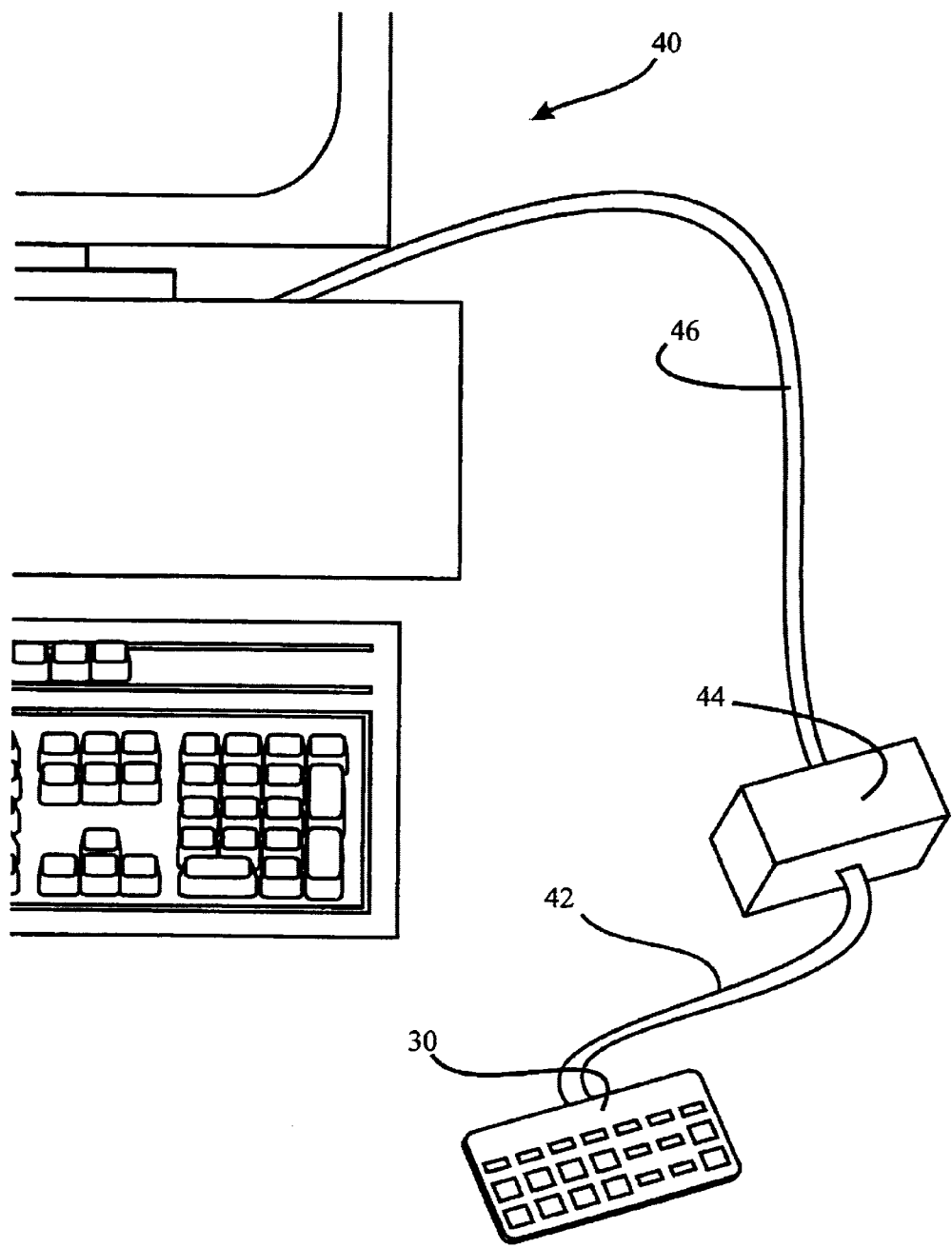
FIG. 2 is a perspective view of a preferred embodiment of the present invention, depicting one mode of using the present invention.

By now turning to FIG. 2, one may gain an understanding of one preferred arrangement for connecting the present invention to a browser terminal. Depicted in FIG. 2 is a typical browser terminal 40, in this case, a personal computer having a conventional keyboard 10. As can be seen, the keypad 30 has a first communicating means 42 extending from it. In the embodiment depicted, the first communicating means 42 is wires; other embodiments are available that include some sort of wireless means of communication, such as optical and radio frequency transmission, among others.

The first communicating means 42 may lead to the translator 44. The translator 44 takes user input from the keypad 30 and translates it into signals that are useable by the browser terminal 40. The translator 44 box depicted is merely one embodiment; other preferred translators could be part of the keypad 30 or even installed into the browser terminal 40.

Leading from the translator 44 to the browser terminal 40 is a second communicating means 46. As with the first communicating means 42, the second communicating means could be wires or wireless, such as optical, radio frequency signals, among others well known in the art.

Figure 3:
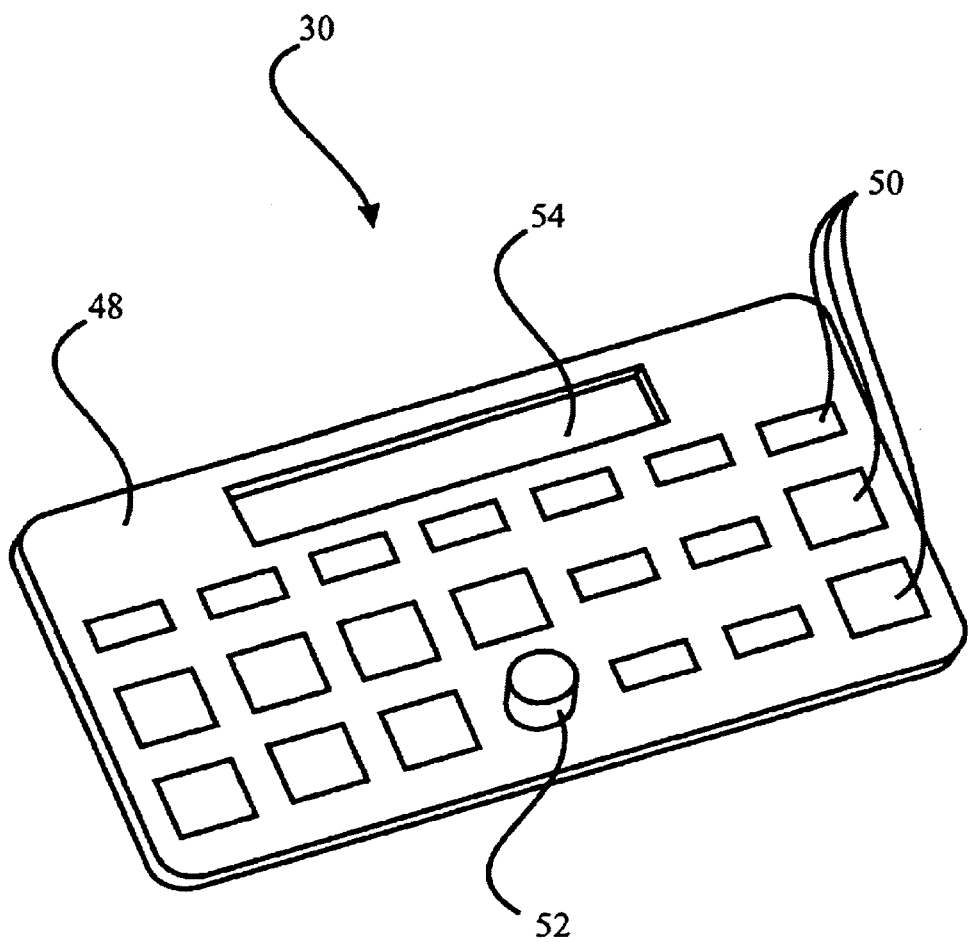
FIG. 3 is a perspective view of a preferred embodiment of the present invention depicting a preferred arrangement of the face features.

FIG. 3 provides additional detail regarding the keypad 30. FIG. 3 is a perspective view of a preferred embodiment of the present invention depicting a preferred arrangement of the face features. In a preferred form, the keypad 30 comprises a thin housing 48. This housing 48 may be made from many conventional materials, such that a lightweight, durable structure is created; in the present form it is plastic. On the face of the housing 48 are disbursed a plurality of buttons 50 and a pointer 52. These buttons 50 may be in a variety of forms, including keys or buttons, touchpads, or other touch-sensitive switches. The pointer 52 depicted here is akin to a miniature joystick. The pointer 52 may be pivoted around its axis with a user's finger to provide directional input to the browser terminal (not shown). Other types of pointers 52 may be used, including trackballs, touch pads, and the like.

A further aspect shown in FIG. 3 is the display 54. The display 54 may be located in virtually any position on the housing 48. The purpose of the display 54 is to provide information to the user. Examples of desirable information might be elapsed time or time of day; status or strength of the keypad's connection to the browser terminal, as well as the URL address, among many other bits of information. The display 54 should be fairly small, to retain the compact form of the keypad 30.

Included in the present invention, but not shown in FIG. 3 is a variety of indicia disposed on the buttons 50 and the face of the housing 48. Indicia may be inscribed on these surfaces to provide information regarding the functionality of the keypad 30, or merely just for aesthetic purposes.

Figure 4:
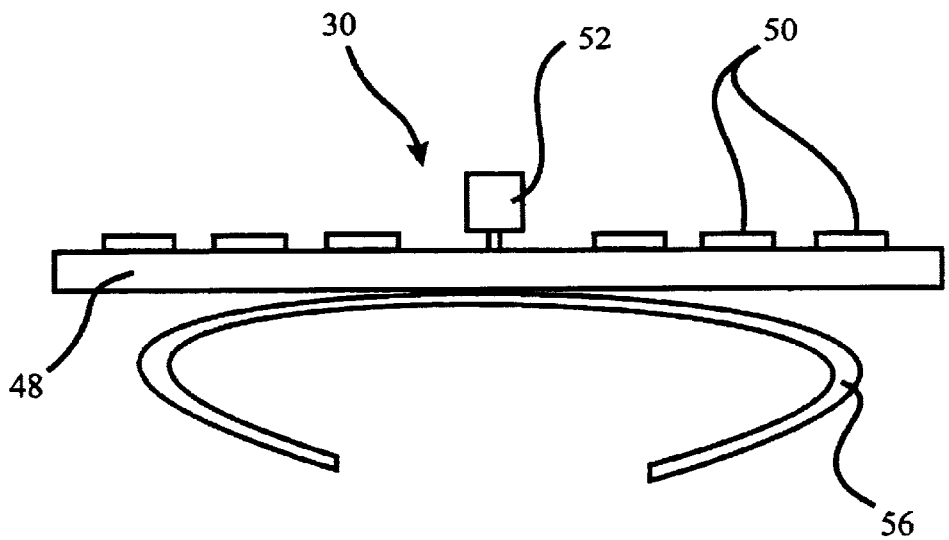
FIG. 4 is a front elevation of a preferred embodiment of the present invention, further depicting a preferred attaching means.

An additional feature of the present invention is its attachability to external structures. FIG. 4 illuminates this feature. FIG. 4 is a front elevation of a preferred embodiment of the present invention, further depicting a preferred attaching means 56. As can be seen from the drawing, the attaching means 56 may be fixed to the bottom side of the housing 48. The attaching means 56 could be in a variety of forms, including a rigid clip, a flexible cuff or sleeve, a strap with "Velcro" or snaps, etc. The attaching means 56 could be used to attach the keypad 30 to one's wrist, arm, leg or even some desktop or chair-type structure. Once attached to the external structure, the keypad 30 would be very easy to locate and use. This would help to reduce workspace clutter.

Figure 5:
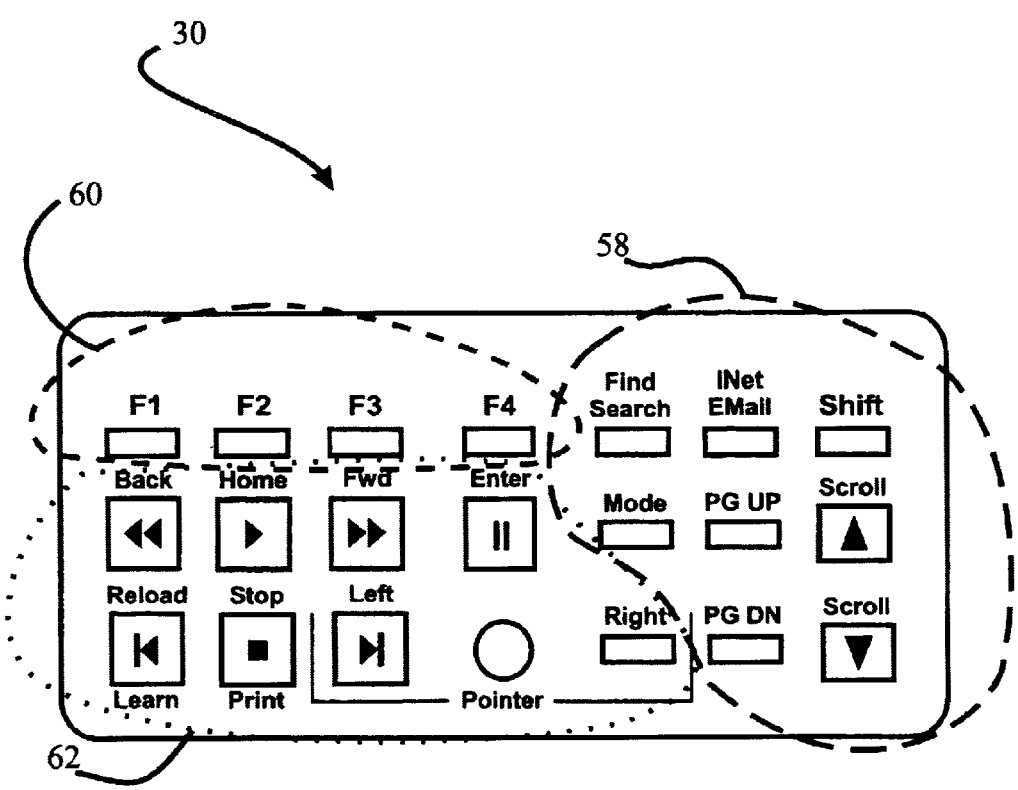
FIG. 5 is a top view of a preferred embodiment of the present invention, highlighting the functional arrangement of controls.

The specific functionality of the present invention may be best appreciated by consideration of FIG. 5. FIG. 5 shows that the buttons and pointer are divided into 3 functional groups. These groups are provided to give users the convenience of having like controls grouped intuitively. Other arrangements of groups may be provided, such as for keypads 30 that are configured for specifically one type of browser; in any case, the keypad 30 provides interface with "browser functions" and "keyboard functions"; browser functions are those functions executed by browser software that are not found on a conventional computer keyboard; keyboard functions are functions executed by browser software that are found on a conventional computer keyboard. It should further be appreciated that "browser" software is currently most recognized for its use on the World-Wide Web (or Internet), however, many other systems use this browser interface, including, for example, Automatic Teller Machines for banks; the present invention is the first such device to interface with any type of browser.

The control group 58 is a portion of the keypad that handles "high-level" communications with the browser terminal. Single-key functions that can be found within the control group 58 include: "Search" which launches a preferred search engine from the browser; "iNet/eMail" which launches a user's email software or browser, alternately; "Mode" which may enable or disable the on-screen display of a browser's tool bars at the top of the screen (in order to provide a full-screen view); "PG UP" and "PG DN" provide for quick traversing through a multi-paged on-screen document, one page at a time; "Scroll ⇑" and "Scroll ⇓" permit the user to scroll up and down the displayed web page by a line at a time, or continuously; and "Shift" which may be depressed prior to one of the other pre-programmed buttons in order to access a secondary function assigned to that particular button or other touch-sensitive switch.

The user-programmable group 60 is a series of user-programmable buttons that can be configured for a variety of "shortcut" internet applications, such as going to the user's favorite news and information site, accessing a preferred page location, getting a stock quotation or reviewing a stock portfolio; the possibilities are virtually limitless.

The navigating group 62 is a series of buttons that allow a user to maneuver efficiently through a particular document being viewed in an efficient manner. The navigating group 62 also includes the pointer (see FIG. 4) and "left" and "right" "mouse buttons," allowing the user full mouse functionality in a more ergonomically desirable interface. Both mouse buttons are programmable and interchangeable, such that either or both can perform any standard mouse button function. The other buttons comprising the navigating group 62 may provide the following functions:

"Back"—may take the user back to the previous "web page" that was viewed during a particular session "Home"—may return the user to a pre-selected home page "Fwd"—may take the user forward to a previous web page that was viewed during a particular session (i.e. after going "Back")

"Learn"—may be a programmable function when programming one of the buttons in the User-programmable Group 60. Alternately, it might be assigned to the secondary function of a button (accessed by first selecting the "Shift" button).

"Reload"—may reload the current web page again

"Stop"—may interrupt the transfer of information to the terminal in use

"Print"—may cause the printing of the web page or other active file being viewed. It may be assigned to the secondary function, accessed by first selecting the "shift" function.

"Enter"—may allow a user to open a networked document or application or to select an on-screen object upon which the pointer is indicating (i.e. clicking on something).

The pointing device depicted in FIGS. 1–5 is only one preferred embodiment; other embodiments might include a trackball-type pointing device or even a conventional rolling mouse-type pointing device, such as used in the mouse 25 (see FIG. 1).

Other functionality may be available in other embodiments of the present invention, depending upon the particular application intended for the keypad. The present invention may include embodiments that will facilitate the interface with browser software "terminals" that comprise televisions, telephones, video game units, personal digital assistants and other consumer products, in addition to personal computers. By moving the software functions of an Internet browser onto a convenient, easy-to-use, hand-held or mounted device, the present invention will provide users with significant advantages over current means for interfacing with browsers.

The ability to control the Internet browser function from a pocket-sized device is a capability unique to the present invention. This permits the use of full-screen viewing of web page content and easier intuitive control of browser functions.

It is the intent of the inventor that the present invention not be limited to interfacing with only "Internet browsers." Preferred embodiments of the present invention include interfaces matched to browsers that are configured to perform as computer operating systems, as well as other applications. The present invention is specifically intended to be applied anywhere that a browser, or graphical user interface, is used; examples might be word processing program interfaces, spread sheet program interfaces, and any number of other program applications.

It is expected that the particular functionality of the buttons or touch-sensitive switches disposed upon the keypad 30 might be responsive to the application that the user is interfacing with. For example, a particular button might activate the "paste" function while the user is interfacing with a word processor program, however the identical button may activate the "stop" function when interfacing with an Internet browser. In such circumstances, the labels on, above or below each touch-sensitive switch might also change with the function of each touch-sensitive switch.

Figure 6:
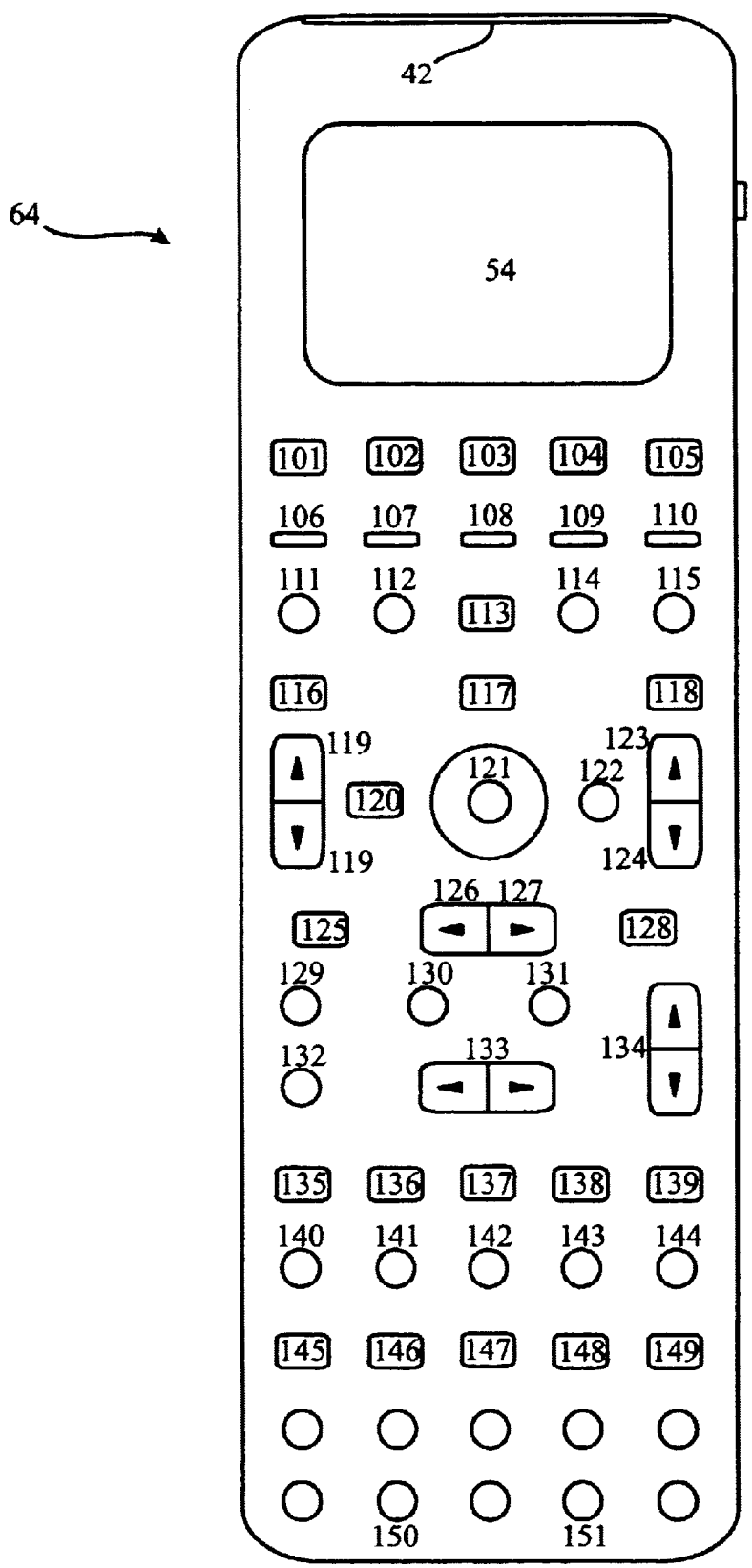
FIG. 6 is a front view of another preferred embodiment of the present invention as it might incorporate features to provide interface to additional functionality.

FIGS. 6–9 depict alternative preferred embodiments of the present invention. FIG. 6 is a front view of a "Multimedia Surfpad" 64, which is, essentially, the previously-described interface for internet, intranet and other browser software included in a pocket-sized, typically remote, control. The "Multimedia Surfpad" 64 may include one or more of the following "Modes": (1) Surfpad Mode for interacting with browser software; (2) TVpad Mode for interacting with a conventional television or video display set; (3) Phonepad Mode for performing conventional and/or world-wide web telephony, pager, telephone book, radio and/or voicemail functions; (4) Digitalpad Mode for interacting with other external devices, such as Compact or other Disk player/recorders, Video player/recorders, "Real Audio" software functions, a variety of game controls, as well as other home, office and industrial devices that interact with browser software (e.g. fax, copy, print and email machines); (5) Appliancepad Mode for interacting with home convenience appliances, such as dishwashers, clothes washer/dryers, stoves and ovens, etc.; and (6) E-Commercepad Mode for interacting with electronic commerce type kiosks or terminals, such as Bank terminals, credit card terminals, or other terminals. Each Mode has selected first tier software functions assigned to the touch-sensitive switches found on the multimedia surfpad 64. The detailed index and definition for the "first tier" software functions triggered by each touch-activated switch on the Multimedia Surfpad 64 is disclosed below after a discussion of other embodiments of the present invention.

Figure 7:
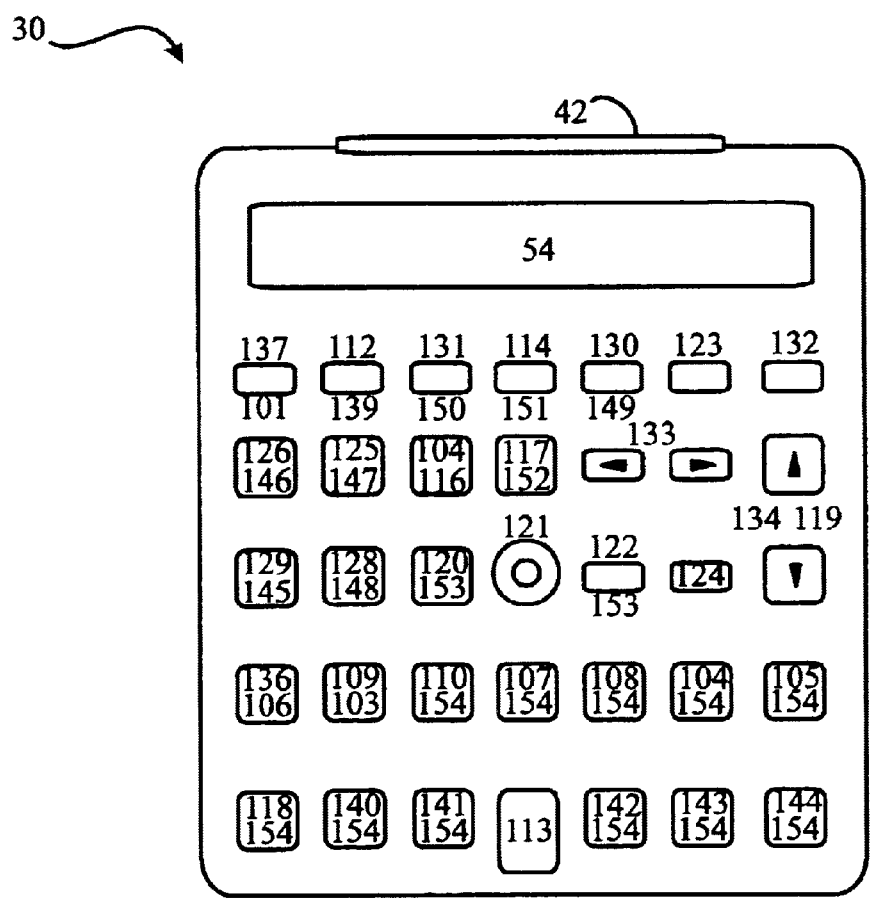
FIG. 7 is a front view of still another preferred embodiment of the present invention as it might be available for normal as well as physically handicapped users.

Furthermore, the Display screen 54 may display, and allow the selection of, "second tier" functions with which the user may interact. A mode-specific hierarchical menu may be displayed for interaction by the user. Examples of these menus include:

"Surfpad" Mode:
  "Surfing"
    display URL of current "location"
    display list of recently visited "locations"
    display elapsed log-on time
    display a screen depicting touch- and voice-activated switches to interact with world-wide web browsers
  "E-mail"
    display address book function
    display security function
    display a screen depicting touch- and voice-activated switches to interact with electronic mail applications "TVpad" Mode:
  display current channel number
  interact with channel selection function
  provide volume display and control
  interact with channel or program search functions display a screen depicting touch- and voice-activated switches to interact with television terminal functions "Phonepad" Mode:
  Outgoing Calls
    display telephone number to be called
    display telephone book function
    display elapsed time for call
    display video/still of person being called
    display caller ID of the person being called
    display a screen depicting touch- and voice-activated switches to interact with telephone functions
  Incoming Calls
    display caller ID information
    display elapsed time for call
    display video/still of person calling "Digitalpad" Mode:
  CD controls
  Video controls
  Real Audio controls
  Game controls
  display a screen depicting touch- and voice-activated switches to interact with multimedia equipment "Appliancepad" Mode:
  Home Security System operations
  Home/Building management system
    HVAC
    lighting
    stove/oven
    coffee maker
    etc., etc.
  display a screen depicting touch- and voice-activated switches to interact with household equipment "E-Commerce" Mode:
  Banking functions
  Shopping functions
  Information/Access security functionality to prevent unauthorized use/usurpation of the user's financial identity.
  display a screen depicting touch- and voice-activated switches to interact with banking and/or shopping transaction equipment FIG. 7 is a front view of another preferred embodiment of the present invention, having still another arrangement of features and/or controls in addition to the browser software control features previously described. It is a further option to enlarge the size and features of the keypad 30 displayed in FIG. 7 such that it may be suitable for users with particular handicaps, such as lack of full functionality in the hands and/or fingers. In this "handicap" model, the keypad, switches and display may be roughly twice the size of a conventional model, with the pointing device 121 being longer and therefore easier to operate.

Figure 8:
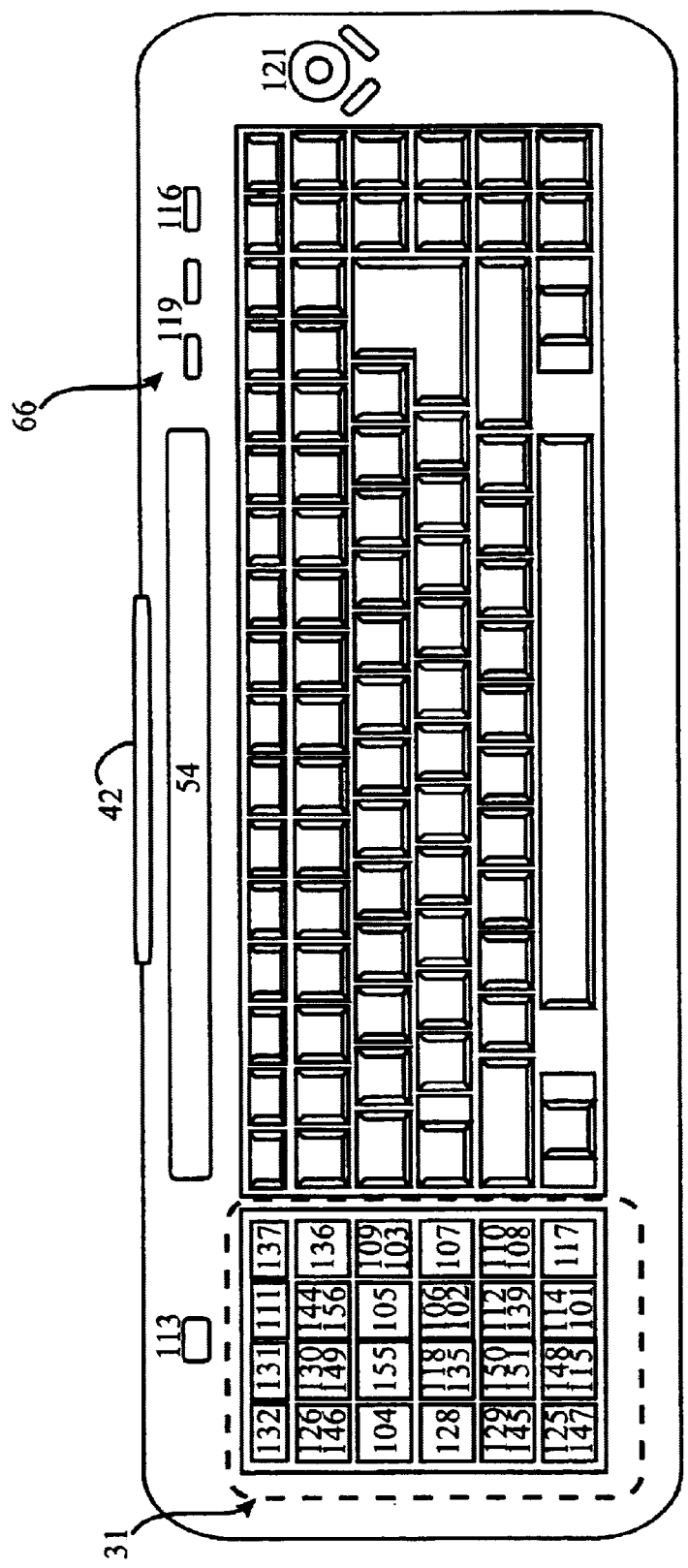
FIG. 8 is a front view of yet another preferred embodiment of the present invention as it might be attached to, or incorporated within a conventional or standard computer keyboard.

FIG. 8 is a front view of yet another preferred embodiment of the keypad 31 of the present invention, as it might be attached to, or within, a conventional keyboard. As can be seen, the keypad 31 of FIG. 8 only includes "browser functions", and not "keyboard functions" as discussed above. The location of the keypad 31 on the computer keyboard 66 is not critical, and it could be above, below or on either side or corner of the keyboard function keys. The keypad 31 may attach to the keyboard 66 by a variety of conventional means, including removing existing function keys and replacing them with the keypad 31.

Index for Touch- and Voice-Sensitive Switches

Note: Each switch listed might also be available in a voice-activated form, such that the user might activate each feature via voice command.

101. "Delete"—deletes the active file on the desktop (i.e. in the browser)

102. "File"—opens the email filing function or other filing function available to the active application 103. "Spell"—opens the spell check application and begins spell-checking the active file or document
104. "Forward"—activates the E-mail Forward function for the Electronic mail application file that is open
105. "Reply"—activates the E-mail Reply function for the Electronic mail application file that is open
106. "Address"—activates an E-mail Address Book function while in the "Surfpad" mode, and a Telephone Book function while in "Phonepad" mode
107. "Send"—sends the active E-mail file when in the Electronic Mail mode; activates the Telephone dialer when in the "Phonepad" mode; activates the "Send Page or Link" function of the browser when in the "Surfpad" mode
108. "Write"—opens a new Electronic mail file to allow the user to compose a new electronic mail message
109. "Get"—activates the "Retrieve New Messages" function
110. "Read" opens the "Inbox" directory, or other active location for messages (e.g. "outbox" or "sent messages")
111. "Full/Min"—activates the "maximize/minimize window" function
112. "Drag"/ "*"—Activates the drag function; locks a selected screen portion to permit the user to move (drag) it to another location within the application. When drag is complete, a left click will release the locked area. The Star key function will activate telephony functions in the "Phonepad" mode, or may be used in other modes for other functions.
113. "Microphone"—Microphone or other sound receptor for accepting voice data; may interact with voice-activated functions; speech recognition functions, voice recording and/or sound communication functions of the browser and/or "Phonepad", and/or "Web Phone" applications.
114. "Close"/"#"—activates the "close active window" function and the "#" character
115. "Cancel"—activates the "cancel" function
116. "Mute"—activates the sound control function to mute the sound output (on/off control)
117. "Open"—activates the open file function; same as Enter or Return
118. "Voice"—activates the voice recognition functions and/or activates the microphone (on/off control)
119. "Volume UP/DOWN"—activates the increase/decrease volume functions
120. "Left"—activates the left mouse click function
121. Pointing Device—conventional pointing device; trackball, joystick, trackpad, etc.
122. "Right"—activates the right mouse click function
123. "Page Up"—activates the "page up" function
124. "Page Down"—activates the "page down" function
125. "Home"—activates the "home" function
126. "Back"—as discussed above, in "Surfpad" mode may take the user back to the previous "web page" that was viewed during a particular session
127. "FWD"—as discussed above, in "Surfpad" mode, may take the user forward to a previous web page that was viewed during a particular session; in "Digitalpad" mode it indexes forward on tracks of a compact disc, video tape or disc.
128. "Stop"—as discussed above, in "Surfpad" mode, may terminate the transfer of data to the terminal in use; in "Phonepad" mode, may end the active call; furthermore, in "Digitalpad" or "Appliancepad" mode, it may stop functions then in progress
129. "Reload"—as discussed above in connection with FIGS. 4–5
130. "Search"—as discussed above in connection with FIGS. 4–5
131. "Book Marks"—activates the "Open Bookmarks" and/or "Favorites" functions and files
132. "Shift"—Activates secondary function assigned to a switch. When the shift key is activated by depressing it a single time, the shift function may be locked (a status indicator light or display may show that the shift is locked). In order to unlock the shift function, the user need merely depress the shift key another time.
133. "Scroll RIGHT/LEFT"—as discussed above in connection with FIGS. 4–5, except is to scroll right and/or left
134. "Scroll UP/DOWN"—as discussed above in connection with FIGS. 4–5
135. "Phone"—activates the "Phonepad" mode
136. "E-mail"—as discussed above in connection with FIGS. 4–5
137. "iNet"—as discussed above in connection with FIGS. 4–5
138. "TV"—activates "TVpad" mode
139. "Help"—activates the help function for the active file or application
140. "Cut"—activates the "cut" function of the browser or other software application
141. "Copy"—activates the "copy" function of the browser or other software application
142. "Paste"—activates the "paste" function of the browser or other software application
143. "Save"—activates the "save" function of the browser or other software application
144. "Launch"—may activate the launch function of the browser or other user-defined software application
145. "Learn"—permits the user to program the user-programmable switches
146. "Mode"—permits the user to interact with the Mode menus and selections
147. "Pause"—may activate the pause function of the browser of other user-defined software application
148. "Print"—activates the "print" function of the browser or other software application
149. "Find"—activates the "find" function of the browser or other software application
150. "Redial"—activates the "redial" function when in the "Phonepad" mode
151. "Flash"—activates the switch between calls function when in the "Phonepad" mode
152. "Enter"—as defined previously herein
153. See "Left" and "Right" above
154. Numerical Keys (1–0)—conventional numerical input
155. "*"/"#" Characters—as discussed previously herein
156. "Channels"—Activates the "open channel viewer" function of the active application.

Figure 9:
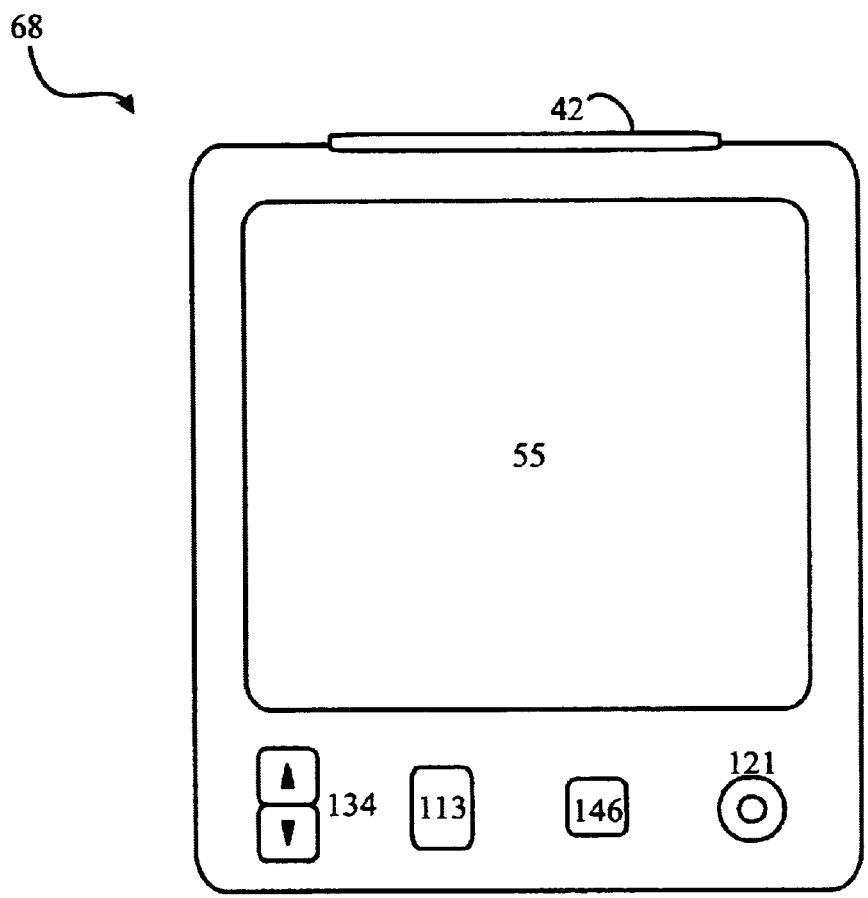
FIG. 9 is a front view of another preferred embodiment of the present invention, having a touch-sensitive "touch pad" that might also be activated by voice commands.

FIG. 9 is a front view of still another embodiment of the present invention; the "touchpad surfpad" 68. Essentially, the touchpad Surfpad 68 provides all of the functionality of the previously-described embodiments, however many of them are activated via a touchpad screen 55, or via voice command. The touchpad screen 55 displays the touch- or, alternatively, voice-sensitive switches; furthermore, there may be several levels of different switch layouts—pressing the mode switch 146 (which might also be found on the touchpad screen 55) may cause the switch display (and therefore functionality) to change. As with the other embodiments, a pointing device 121, microphone 113, scroll up/down switch 134 and wireless communications port 42 may also be found. What is unique is the arrangement of application-specific functionality in a pocket-sized user interface.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A user interface for at least one browser terminal, as well as an entertainment system, a TV or a telephone, each said terminal providing users interface to browser software applications, said software comprising browser functions not found on a standard computer keyboard and keyboard functions that are found on a standard computer keyboard, comprising:
   a pocket-sized keypad for accepting user input to at least one browser terminal, comprising:
      a pocket-sized housing further having a face and a plurality of touch-sensitive switches disbursed across said face to accept user input to select said browser functions, as well as to select TVpad functions, Phonepad functions, Digitalpad functions and Appliancepad functions;
      at least one pointer device located on said housing.

2. The interface of claim 1, wherein:
   said face further comprises a display portion for displaying pertinent messages; and
   said interface further comprises a translator for receiving said user input from said keypad and translating said user input into application-specific commands for use by at least one browser terminal, said translator further receives information from at least one browser terminal and translates said received information for use by said keypad.

3. The interface of claim 2, wherein said first communicating means comprises optical transmissions through air.

4. The interface of claim 2, wherein said first communicating means comprises radio frequency signal transmission through air.

5. The system of claim 2, wherein said keypad further comprises touch- or voice-sensitive switches for accepting user input to TVpad functions, Phonepad functions, Digitalpad functions, Appliancepad functions and E-Commercepad functions.

6. The interface of claim 1, wherein said housing is integrated into a conventional computer keyboard.

7. The interface of claim 1, wherein said TVpad functions comprise:
   display current channel number;
   channel number selection;
   display current volume;
   volume level selection; and
   program search selection.

8. The interface of claim 1, wherein said Phonepad functions comprise:
   display telephone number to be called;
   display telephone book function;
   display elapsed time for call; and
   display a screen depicting touch- and voice-activated switches to interact with telephone functions.

9. The interface of claim 1, wherein said Digitalpad functions comprise:
   control compact disc player functions;
   control video terminal functions; and
   control video game functions.

10. The interface of claim 1, wherein said Appliancepad functions comprise:
    control of home security system operations; and
    home/building management system operations.

11. The interface of claim 1, wherein said E-Commercepad functions comprise:
    banking functions;
    shopping functions; and
    information/access security functions.

12. A system for providing users with and application-specific interface, comprising:
    a browser terminal for providing users interface to browser software applications, said software comprising browser functions not found on a standard computer keyboard and keyboard functions that are found on a standard computer keyboard, comprising:
       a pocket-sized keypad for accepting user input to at least one browser terminal to operate said browser functions, as well as to select functions that belong to the group of Mode Functions, said Mode Functions group comprising: TVpad functions, Phonepad functions, Digitalpad functions, Appliancepad functions and E-Commercepad functions;
       at least one pointer device located on said housing.

13. The system of claim 12, wherein said keypad further comprises:
    a pocket-size housing further having a face;
    a plurality of touch-sensitive switches disbursed across said face; and at least one pointer device located on said housing.

14. The system of claim 13, further comprising:
    a translator for receiving said user input from said keypad and translating said user input into application-specific commands for use by at least one browser terminal;
    a first communicating means for said keypad to communicate with said translator; and
    a second communicating means for said translator to communicate with at least one browser terminal.

15. The system of claim 14, further comprising:
    attaching means for attaching said keypad to a user's hand, arm or leg, or other structure external to said user's person.

16. The system of claim 15, wherein said keypad comprises twenty touch-sensitive switches and one pointing device and said twenty touch-sensitive switches and one said pointing device are arranged in functional groups.

17. The system of claim 14, wherein said keypad further comprises touch- or voice-sensitive switches for accepting user input to TVpad functions, Phonepad functions, Digitalpad functions, Appliancepad functions and E-Commercepad functions.

18. The system of claim 17, wherein said functional groups comprise:
    a user-programmable group comprising four said touch-sensitive switches;
    a control group comprising eight said touch-sensitive switches, at least one of said switches permitting the user to select at least one said browser function; and
    a navigating group comprising eight said touch-sensitive switches, and one said pointing device, at least one of said switches permitting the user to select at least one said browser function.

* * * * *